United States Patent [19]

Plut

[11] 4,111,132
[45] Sep. 5, 1978

[54] APPLIANCE TRANSPORT ACCESSORY

[76] Inventor: Louis Plut, 471 Wilde Ave., San Francisco, Calif. 94134

[21] Appl. No.: 809,376

[22] Filed: Jun. 23, 1977

[51] Int. Cl.² .............................................. B60P 7/08
[52] U.S. Cl. ................................. 105/469; 105/478; 24/73 A; 280/179 A
[58] Field of Search ............... 24/17 A, 68 CD, 73 A; 105/469, 478; 280/179 A; 248/503, 505

[56] References Cited

U.S. PATENT DOCUMENTS

| | | | |
|---|---|---|---|
| 552,198 | 12/1895 | Porter | 24/73 A |
| 1,696,220 | 12/1928 | Townsend | 24/73 A |
| 2,372,967 | 4/1945 | Martin | 280/179 A |
| 3,128,106 | 4/1964 | Zinkel | 24/68 CD |
| 3,934,509 | 1/1976 | Saunders et al. | 24/17 A |

Primary Examiner—Henry S. Jaudon
Attorney, Agent, or Firm—Daniel Jay Tick

[57] ABSTRACT

A strap for releasably securing an appliance to the cross pieces of an inside wall of a delivery truck with sufficient tension to prevent jarring or movement of the appliance, has a hook device affixed to its first end for releasably securing such first end to a cross piece when the strap passes around the appliance. A projecting device is affixed to the second, opposite, end of the strap and extends therefrom. A strip of elastic material is interposed in the strap between the first and second ends thereof for providing elasticity in the strap. A slot device is affixed to the strap in the area of its second end, but spaced from such end, for releasably accommodating the projecting device to releasably secure the appliance to the cross piece via the strap.

1 Claim, 2 Drawing Figures

U.S. Patent  Sept. 5, 1978  4,111,132
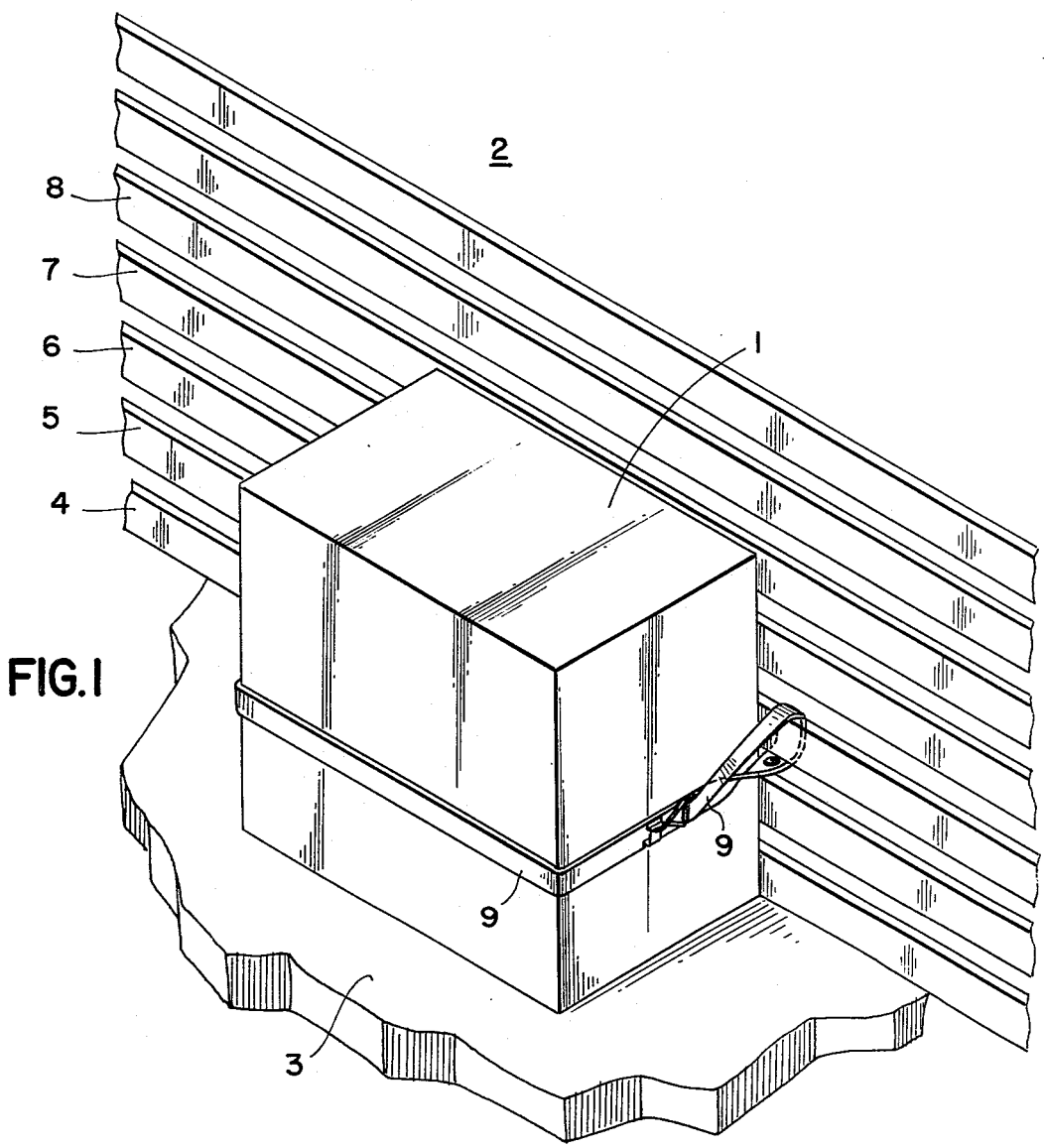
FIG.1
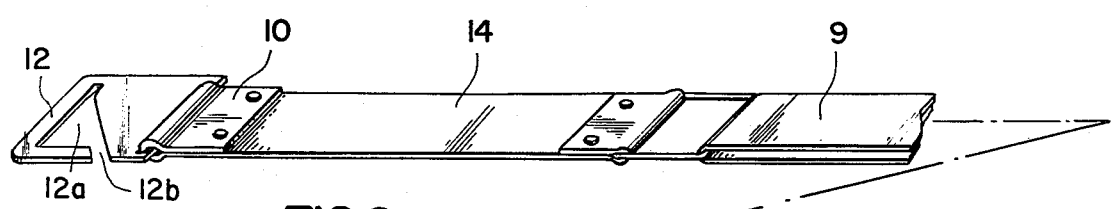
FIG.2
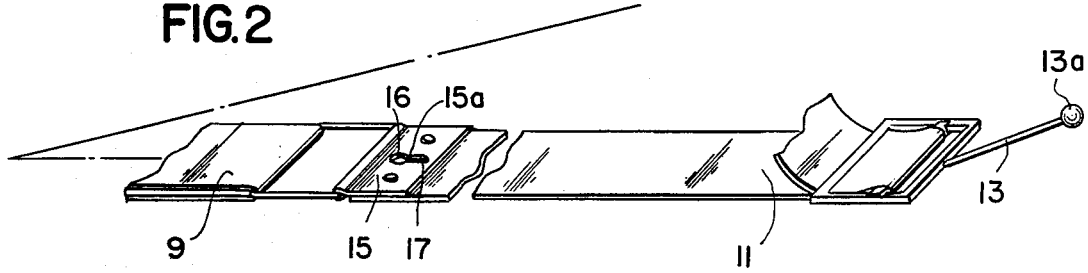

APPLIANCE TRANSPORT ACCESSORY

BACKGROUND OF THE INVENTION

The present invention relates to an appliance transport accessory. More particularly, the invention relates to an appliance transport accessory for securing an appliance to an inside wall of a delivery truck having a plurality of spaced parallel substantially horizontally extending cross pieces affixed to an inside surface of an inside wall thereof in spaced relation therewith.

Objects of the invention are to provide an appliance transport accessory of simple structure, which is inexpensive in manufacture and functions efficiently, effectively and reliably to secure an appliance to an inside wall of a delivery truck with sufficient tension to prevent jarring or movement of the appliance thereby preventing damage of the appliance.

BRIEF DESCRIPTION OF THE DRAWINGS

In order that the invention may be readily carried into effect, it will now be described with reference to the accompanying drawings, wherein:

FIG. 1 is a perspective view of an embodiment of the appliance transport accessory of the invention in use; and FIG. 2 is a perspective view, on an enlarged scale, of the appliance transport accessory of the invention.

DETAILED DESCRIPTION OF THE INVENTION

The appliance transport accessory of the invention functions to secure an appliance 1 to an inside wall 2 of a delivery truck 3, as shown in FIG. 1. A plurality of spaced parallel substantially horizontally extending cross pieces 4, 5, 6, 7, 8, and so on, are affixed to the inside surface of the inside wall 2 of the delivery truck 3 in spaced relation therewith (FIG. 1).

The appliance transport accessory of the invention comprises a strap 9 (FIGS. 1 and 2) for releasably securing the appliance 1 to the cross pieces of the inside wall of the truck with sufficient tension to prevent jarring or movement of the appliance. The strap 9 has spaced opposite first and second ends 10 and 11 (FIG. 2). A hook device 12 is affixed to the first end 10 of the strap 9 for releasably securing said first end to a cross piece 4, 5, 6, 7 or 8, or the like, when said strap passes around the appliance 1, in the manner shown in FIG. 1.

A projecting device 13 is adjustably affixed to the second end 11 of the strap 9 and extends therefrom, as shown in FIG. 2. The projecting device comprises a pivotally mounted rod-like member having a spherical knob at its free end.

In accordance with the invention, a strip of elastic material 14 (FIG. 2) is interposed in the strap 9 between the first and second ends 10 and 11 thereof for providing elasticity in the strap. The strip of elastic material 14 may comprise any suitable known elastic material such as, for example, rubber.

A slot device 15 is affixed to the strap 9 in the area of the second end 11 thereof, but spaced from said second end for releasably accommodating the projecting device 13. More particularly, the slot device 15 accommodates the spherical knob 13a of the projecting device 13 in a manner whereby said knob fits through the slot 15a of said slot device via an enlarged part 16 of said slot and, as said projecting device is moved in said slot, it passes into the narrow dimensioned area 17 of said slot and is locked in said slot device because said projecting device is prevented from being removed from said slot by said knob. The slot 15a has the enlarged circular part 16 of larger diameter than the knob 13a, and the narrow linear area 17 of larger diameter than the projecting device 13, but of smaller diameter than said knob.

Thus, the length of the strap 9 between the slot device 15 and the projecting device 13 is passable around a cross piece, such as, for example, the cross piece 6, as shown in FIG. 1, and the projecting device is releasably secured in the slot device to releasably secure the appliance 1 to said cross piece. The elastic or resilient nature of the rubber strip 14 permits the strap 9 to snugly secure the appliance 1 to the wall of the truck without shifting or movement of any kind and therefore prevents damage of such appliance.

Similarly, the length of the strap 9 in the area of its first end 10 is passable around a cross piece, such as, for example, the same cross piece 6, on the other side of the appliance 1 after said strap is passed around said appliance. The hook device 12 is then releasably secured to the strap 9 by being placed on said strap so that said strap fits in the area 12a formed by said hook device, via the slot 12b extending into said area.

While the invention has been described by means of a specific example and in a specific embodiment, I do not wish to be limited thereto, for obvious modifications will occur to those skilled in the art without departing from the spirit and scope of the invention.

I claim:

1. An appliance transport accessory for securing an appliance to an inside wall of a delivery truck having a plurality of spaced parallel substantially horizontally extending cross pieces affixed to an inside surface of an inside wall thereof in spaced relation therewith, said appliance transport accessory comprising strap means for releasably securing an appliance to the cross pieces of the inside wall of the truck with sufficient tension to prevent jarring or movement of the appliance, said strap means having spaced opposite first and second ends, a hook device affixed to the first end thereof for releasably securing said first end to a cross piece when said strap means passes around said appliance, a projecting device affixed to the second end thereof and extending therefrom and a strip of elastic material interposed in the strap means between the first and second ends thereof for providing elasticity in the strap means; and slot means affixed to the strap means in the area of the second end thereof but spaced from said second end for releasably accommodating the projecting device in a manner whereby the length of the strap means between the slot means and the projecting device is passable around a cross piece and said projecting device is releasably secured in said slot means to releasably secure the appliance to said cross piece.

* * * * *